G. H. SCHKOMMODAU.
ELECTRODE FOR ELECTRIC WELDING MACHINES.
APPLICATION FILED OCT. 8, 1917.
1,267,463.
Patented May 28, 1918.
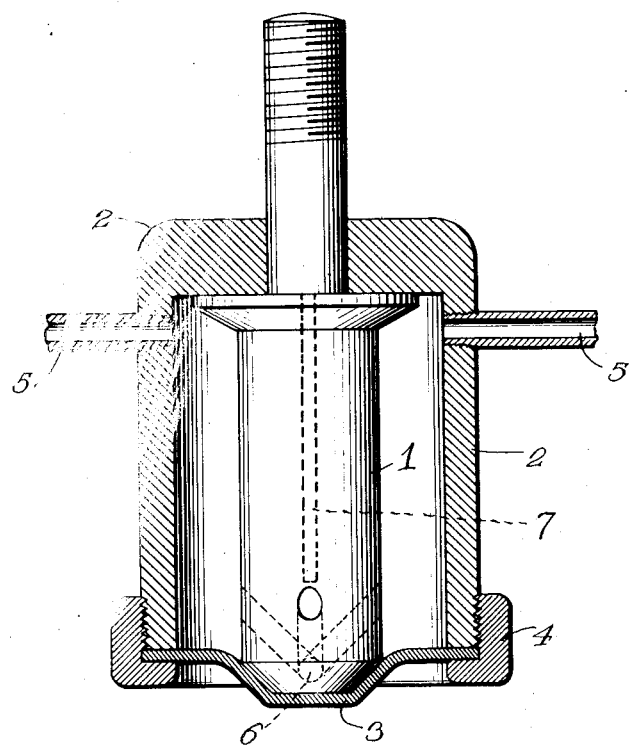
INVENTOR
Gustave Hermann Schkommodau
BY
Townsend & Decker
ATTORNEYS

UNITED STATES PATENT OFFICE.

GUSTAVE HERMANN SCHKOMMODAU, OF CINCINNATI, OHIO, ASSIGNOR TO THOMSON SPOT WELDER COMPANY, OF BOSTON, MASSACHUSETTS, A CORPORATION OF MASSACHUSETTS.

ELECTRODE FOR ELECTRIC WELDING-MACHINES.

1,267,463.   Specification of Letters Patent.   Patented May 28, 1918.

Application filed October 8, 1917. Serial No. 195,219.

*To all whom it may concern:*

Be it known that I, GUSTAVE HERMANN SCHKOMMODAU, a citizen of the United States, and a resident of Cincinnati, in the county of Hamilton and State of Ohio, have invented certain new and useful Improvements in Electrodes for Electric Welding-Machines, of which the following is a specification.

My invention relates to electrodes for that type of electric metal working apparatus in which the electrode engages directly with the portion of the work to be heated for the purpose of applying heating current and pressure thereto as in spot welding and riveting apparatus. The invention is particularly applicable however to electrodes for spot welding machines and is especially useful in machines employing very heavy current and pressure.

The object of my invention is to provide for ready renewal of the contact end of the electrode and also to provide efficient cooling.

A further object of the invention is to produce an electrode that shall have the above characteristics and at the same time have good conductivity and be capable of being cheaply produced.

To these ends my invention consists of a compound electrode comprising essentially a steel center or core and a copper shell of good conducting material carrying at its lower end a plate of copper or other material engaged by the end of and receiving the pressure of the steel center and removably attached to said shell.

The invention further consists in constructing the shell so that it may form a container for circulation of a cooling medium and in closing the end of said container by a metal plate or stamping which receives the pressure of the steel center and is removably attached to said shell.

The invention further consists in the details of construction hereinafter more particularly described and then specified in the claims.

In the accompanying drawings I have shown a compound electrode embodying my invention in partial vertical central section.

1 is a central rod or core adapted to engage the work by its lower end to apply pressure and heating current thereto. In my improved construction of electrode said rod is made of steel or other suitable material adapted to withstand heavy pressure endwise and said rod engages the work through a thin contact plate of copper 3 or other good conducting material which is in good electrical connection with the source of current through a copper conductor 2, to which said plate 3 is attached.

The conductor 2 is a shell or container of copper or other good conducting material attached to or sustained by the rod 1 and surrounding the same as shown. Said shell may be a casting and is preferably of sufficient size internally to afford space for circulation of a cooling liquid and is connected to the secondary of the current supplying transformer in any desired way.

The contact plate 3 is removably attached to the lower end of shell 2 preferably by a nut 4. Said plate may serve as a closure to seal the water containing space of the shell as well as to receive the pressure from rod 1 and conduct the current into the work at its portion pressed into contact therewith by the rod 1.

Water or other cooling medium may be circulated through the electrode by pipes 5 connected to the shell and the end of the rod 1 as indicated at 6 may have passages drilled in it so that the cooling is brought very near to the work engaging end of the electrode. Longitudinally disposed baffle-plates may be disposed in the form of partitions on diametrical sides of the rod 1 as indicated by the dotted lines 7. The lower ends of these plates terminate somewhat short of or at the entrances to the passages 6 and act to compel the water to circulate down to the work engaging end of the rod 1 in its travel from one pipe 5 to the other. The plate 3 may be a thin metal stamping made of either stamped or pressed copper specially treated to give it high density or of some other good conductor capable of withstanding fairly heavy pressures.

From the above construction it will be readily seen that the electrodes may not only be efficiently cooled but that the part which comes into direct contact with the work and which is liable to deterioration may be very conveniently renewed.

What I claim as my invention is:

1. An electrode for electric metal working apparatus comprising a steel core or center and a surrounding shell carried thereby and provided at its lower end with a removable conducting plate forming the contact surface of the electrode and receiving the pressure of the steel center.

2. A compound electrode for electric metal working apparatus comprising a core or center for applying pressure to the work, a surrounding shell carried by the center and a stamping of hard, good conducting material secured to the end of said shell and engaged by the center as and for the purpose described.

3. An electrode for electric metal working apparatus comprising a center, a shell surrounding the same and forming a container for a cooling medium and a closure for said container removably secured to the lower end thereof and adapted to receive the pressure of the center.

4. A compound electrode for electric metal working apparatus comprising a steel center, a shell carried thereby and provided with means for circulating a cooling medium, a contact plate engaged by the end of the center and closing the end of said shell and means for fastening said plate in position on said shell.

5. A compound electrode for electric metal working apparatus comprising a pressure applying central rod, a shell of good conducting material carried thereby and provided with means for circulating a cooling medium through the space between the shell and center, a plate of hard, good conducting material applied over the end of the shell and receiving the pressure of the center and a nut for clamping said plate in position on the shell.

6. A compound electrode for electric metal working apparatus comprising a pressure applying central rod, a shell of good conducting material carried thereby and provided with means for circulating a cooling medium through the space between the shell and center, said rod being provided with transverse passages for the cooling medium at the work engaging end and a closure for the end of said shell and engaged by said rod.

Signed at New York, in the county of New York and State of New York, this 6th day of October, A. D. 1917.

GUSTAVE HERMANN SCHKOMMODAU.

Witnesses:
F. B. TOWNSEND,
IRENE LEFKOWITZ.